United States Patent
Nzeadibe et al.

(10) Patent No.: US 8,453,735 B2
(45) Date of Patent: Jun. 4, 2013

(54) METHOD AND BIODEGRADABLE WATER BASED THINNER COMPOSITION FOR DRILLING SUBTERRANEAN BOREHOLES WITH AQUEOUS BASED DRILLING FLUID

(75) Inventors: Kingsley Ihueze Nzeadibe, Houston, TX (US); Gregory Paul Perez, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 220 days.

(21) Appl. No.: 12/804,342

(22) Filed: Jul. 20, 2010

(65) Prior Publication Data
US 2012/0018226 A1   Jan. 26, 2012

(51) Int. Cl.
  *E21B 21/00*  (2006.01)
  *E21B 33/14*  (2006.01)
  *C09K 8/035*  (2006.01)
  *C09K 8/12*  (2006.01)

(52) U.S. Cl.
  USPC ............... 166/285; 175/65; 175/72; 507/120; 507/121; 507/904; 507/905

(58) Field of Classification Search
  None
  See application file for complete search history.

(56) References Cited

U.S. PATENT DOCUMENTS

| | | | | | |
|---|---|---|---|---|---|
| RE22,407 | E | * | 12/1943 | Daniel | 507/142 |
| 2,789,949 | A | * | 4/1957 | Scotty | 507/140 |
| 3,850,817 | A | * | 11/1974 | Barthel | 507/145 |
| 4,240,915 | A | * | 12/1980 | Block | 507/145 |
| 6,681,856 | B1 | * | 1/2004 | Chatterji et al. | 166/294 |
| 8,124,670 | B2 | * | 2/2012 | Matzinger et al. | 523/130 |
| 2010/0160488 | A1 | * | 6/2010 | Assmann et al. | 523/130 |
| 2010/0240802 | A1 | * | 9/2010 | Matzinger et al. | 523/130 |

* cited by examiner

Primary Examiner — George Suchfield
(74) Attorney, Agent, or Firm — Craig W. Roddy; Karen B. Tripp

(57) ABSTRACT

An inhibitive water-based polymer mud system and method for using the system in drilling and in stabilizing wellbores is disclosed for use in water sensitive formations as an alternative to oil-based muds. The system comprises a fresh water or salt water base thinned or dispersed with a water soluble, biodegradable polyamide-based copolymer having at least one grafted side chain formed from ethylenic unsaturated compounds. This system is effective and has stable rheology over a broad pH range, even at a near neutral pH of 8.0. The drilling fluids do not contain heavy metals and are rheologically tolerant to contaminants such as cement, anhydrite and sodium and temperatures as high as about 400° F.

18 Claims, 4 Drawing Sheets

METHOD AND BIODEGRADABLE WATER BASED THINNER COMPOSITION FOR DRILLING SUBTERRANEAN BOREHOLES WITH AQUEOUS BASED DRILLING FLUID

BACKGROUND OF THE INVENTION

1. Field of the Invention

The present invention relates to controlling the rheology and/or the viscosity of water based mud systems. More particularly, the present invention relates to methods and compositions for thinning and deflocculating aqueous based fluids used in well drilling and other well operations in subterranean formations, especially subterranean formations containing oil and/or gas. This invention also relates to a drilling fluid thinner and/or dispersant having improved temperature stability, dispersing properties and "solids contamination" tolerance.

2. Description of Relevant Art

A drilling fluid or mud is a specially designed fluid that is circulated through a wellbore as the wellbore is being drilled to facilitate the drilling operation. The various functions of a drilling fluid include removing drill cuttings or solids from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

For a drilling fluid to perform its functions, it must have certain desirable physical properties. The fluid must have a viscosity that is readily pumpable and easily circulated by pumping at pressures ordinarily employed in drilling operations, without undue pressure differentials. The fluid must be sufficiently thixotropic to suspend the cuttings in the borehole when fluid circulation stops. The fluid must release cuttings from the suspension when agitating in the settling pits. It should preferably form a thin impervious filter cake on the borehole wall to prevent loss of liquid from the drilling fluid by filtration into the formations. Such a filter cake effectively seals the borehole wall to inhibit any tendencies of sloughing, heaving or cave-in of rock into the borehole. The composition of the fluid should also preferably be such that cuttings formed during drilling the borehole can be suspended, assimilated or dissolved in the fluid without affecting physical properties of the drilling fluid.

Most drilling fluids used for drilling in the oil and gas industry are water-based muds. Such muds typically comprise an aqueous base, either of fresh water or brine, and agents or additives for suspension, weight or density, oil-wetting, fluid loss or filtration control, and rheology control. Controlling the viscosity of water based muds or mud systems has traditionally been done with lignosulfonate deflocculants and/or thinners. Such low molecular weight, heavily sulfonated polymers are believed to aid in coating clay edges in the subterranean formation with a lasting or effectively permanent negative charge. Some alkaline material, such as, for example, caustic soda or potash, is typically added to achieve a pH range from about 9.5 to about 10. This pH environment is believed to aid the solubility and activation of the portion(s) of the lignosulfonate molecules that interact with the clay. These portions are believed to be the carboxylate and phenolate groups on the lignosulfonate.

Lignosulfonates are obtained from byproducts of the spent acid process used to separate cellulose from wood in the pulp industry. The pulp industry has begun to turn away from the spent acid process in recent years in favor of another process that does not have a lignosulfonate byproduct. Consequently, the drilling fluid industry has begun efforts to find a substitute for lignosulfonates in drilling fluids. Also, increasingly, there is an interest in and need for deflocculants and/or thinners that can work effectively at lower pH ranges of about 8 to about 8.5, in freshwater and saltwater based muds, and at higher temperatures ranging upwards to about 450° F., while also being environmentally compatible.

SUMMARY OF THE INVENTION

The present invention provides improved methods of drilling wellbores in subterranean formations employing water-based muds and compositions for use in such methods. As used herein, the term "drilling" or "drilling wellbores" shall be understood in the broader sense of drilling or wellbore operations, to include running casing and cementing as well as drilling, unless specifically indicated otherwise.

The drilling fluids of the invention comprise an aqueous base and a water soluble, biodegradable, thinner/deflocculant comprising a polyamide-based copolymer having at least one grafted side chain formed from ethylenic unsaturated compounds. In one embodiment, this thinner/deflocculant composition of the invention comprises a graft-copolymer of acrylic acid and acrylo amido propane sulfonate (AMPS) onto gelatin. This thinner/deflocculant for use in the invention has the flexibility of utility with, and solubility in, a fresh water drilling fluid base, as well as in a salt water (brine) drilling fluid base, and is effective even at a near neutral pH of about 8.0 to about 8.5, while still being effective at a higher pH, up to about 10.5.

Drilling fluids of the invention provide an advantage over fluids employing prior art lignosulfonate thinners in that the fluids of the invention maintain satisfactory rheology for drilling at temperatures as high as 400° F. to 450° F. while also being useful at lower temperatures, including temperatures approaching as low as 40° F. Moreover, the thinner/deflocculant used in the present invention does not contain chromium, commonly used with prior art lignosulfonate thinners, and thus the present invention is more environmentally friendly or compatible than such prior art.

Methods of the invention include a method of drilling a wellbore in a subterranean formation employing an aqueous based drilling fluid comprising the thinner/deflocculant discussed above and a method of thinning or dispersing a water-based drilling fluid using such thinner/deflocculant.

DETAILED DESCRIPTION OF PREFERRED EMBODIMENTS

Figure 1:
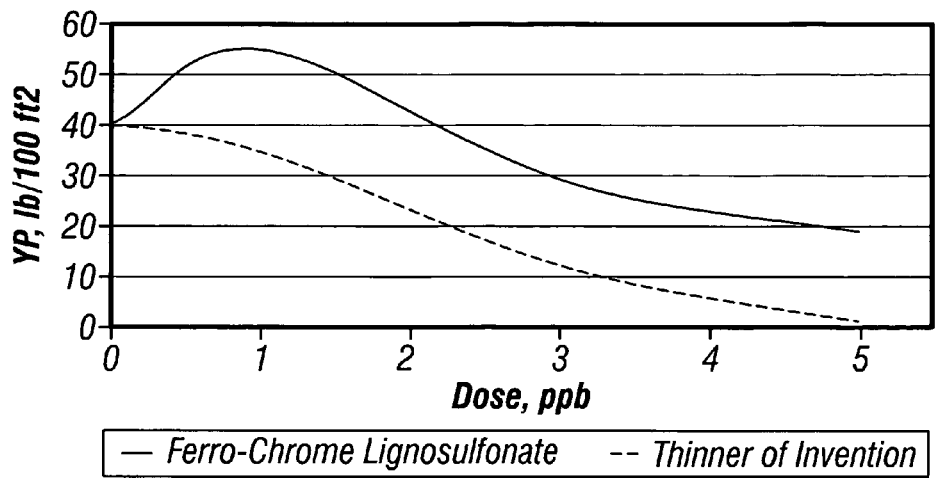
FIG. 1 is a graph comparing the yield point versus dispersant concentration of a thinner of the invention with a ferro-chrome, lignosulfonate thinner, in a gypsum/salt water, 22 lb/bbl AQUAGEL, containing 66 lb/bbl Rev Dust, hot rolled at 150° F., with a pH in the range of 9.2 to 10.

In methods of the present invention, drilling of shales and offshore hydratable formations may be conducted with an aqueous-based drilling fluid which affords rheology control and maintains wellbore stability even though the wellbore penetrates smectites, illites, and mixed layer clays and even though the wellbore temperatures exceed about 350° F. and approach temperatures of about 400° F. or higher.

The present invention provides thinners/deflocculants that impart thinning to water based drilling fluids or mud systems comparable to or better than prior art lignosulfonate deflocculants and/or thinners while effecting such thinning at lower, less caustic, pH, namely about 8.0 to 8.5, than with prior art lignosulfonate deflocculants and/or thinners. Moreover, such thinners/deflocculants of or for use in the invention have the advantage of containing no transition group elements (i.e., heavy metals such as chromium, and cadmium), and are believed to be more environmentally friendly than prior art deflocculants/thinners containing such heavy metals. Further, the thinners/deflocculants are effective at thinning or dispersing water based muds at high temperatures and over a relatively broad pH range (from about 8.0 to about 10.5), and are tolerant of contaminants such as cement, anhydrite and sodium, as well as drill solids.

The thinners/deflocculants of or for use in the invention comprise a biodegradable polyamide-based copolymer having at least one grafted side chain formed from ethylenic unsaturated compounds. One embodiment of such thinners/deflocculants is set forth in detail in international patent application no. PCT/EP2007/058271, and international publication no. WO 2008/019987 A1, of Martin Matzinger, et al., entitled, "Water-Soluble and Biodegradable Copolymers on a Polyamide Basis and Use Thereof,". That publication teaches copolymers containing, as the polyamide component, natural polyamides, especially in the form of caseins, gelatins, collagens, bone glues, blood albumins and soy proteins, or synthetic polyamindes, especially polyaspartic acids or copolymers of aspartic and glutamic acid. Further, that publication teaches copolymers having vinyl-containing compounds in their O, S, P, and N forms as the ethylenic unsaturated component. In different embodiments, such copolymer may have a molar mass greater than 5,000 g/mol, greater than 10,000 g/mol, greater than 20,000 g/mol, greater than 50,000 g/mol, although the publication teaches that the molecular weight of the copolymers is not subject to any restrictions. In one embodiment, the thinner/deflocculant comprises a graft-co-polymer of acrylic acid and AMPS onto gelatin. Without wishing to be limited by theory, it is believed that the AMPS functional groups impart higher temperature stability and greater functionality at a wider pH range.

The thinners/deflocculants for use in the invention have a high thinning efficiency and can mitigate the flocculating effect of electrolyte (salt) in water based fluids even at temperatures as high as 400° F. or higher. The thinners/deflocculants effect thinning and/or deflocculation in saltwater based fluids and in fresh water based fluids and are believed useful and readily soluble in any water based mud suitable for use in drilling or well operations in a subterranean formation, particularly for the discovery and/or recovery of oil and/or gas. Such drilling fluids should not contain chromium (or other similar heavy metals). In one embodiment, the drilling fluids will have a pH of about 8.0 to about 8.5, although the thinners/deflocculants of or for use in the invention will provide thinning and/or deflocculation over a pH range of about 8.0 to about 10.5.

In one embodiment, the drilling fluid of the present invention comprises the above thinner or deflocculant, in an amount that thins the particular drilling fluid the amount needed for the conditions in which the fluid will be used.

In a method of the present invention of drilling a wellbore in a subterranean formation, a water based drilling fluid of the invention containing a thinner or deflocculant of the invention is used. In one embodiment, the thinner or deflocculant is provided with a pH environment of about 8.0 to about 8.5. In another embodiment, the pH may be as high as 10.5 or otherwise in the range of 8.0 to 10.5. In one embodiment, the drilling fluid has a brine base, and in another embodiment, the drilling fluid has a fresh water base. The subterranean formation may have a temperature as low as 40° F., as high as 400° F., or some temperature in between.

The following experiments and examples are illustrative of the advantages of the invention.

Experimental

Drilling fluid samples were prepared according to test procedures in API 13J, known to persons of ordinary skill in the art and incorporated herein by reference. Generally, 350 ml drilling fluid samples were prepared and sheared on a multi-mixer for 60 minutes and then rolled in an oven at the test temperature. Bentonite slurry was mixed according to the Quality Assurance Laboratory Standard Test Procedure for Thinning Efficiency of Fe/Cr Lignosulfonates (STP 17.01.002.01), incorporated herein by reference. A Fann 35A from Fann Instruments was used for the rheology measurements. A pH meter model 420A+ from Thermo Orion was used for the pH determinations. A Zetasizer Nano Series from Malvern Instruments was used to determine the zeta potentials of the thinners/deflocculants. The zeta potential of the thinners/deflocculants was determined by preparing known concentrations of the thinner/deflocculant in ethanolamine buffer at pH 9.4. The zeta potential was measured at 25V and 25° C. using the Zetasizer instrumentation.

Thinning efficiency of the thinner/deflocculant was calculated as follows:

$$\text{Thinning efficiency} = \left( \frac{(YP \text{ Control Mud} - YP \text{ Test Mud})}{(YP \text{ Control Mud} - YP \text{ QUIK-THIN®})} \right) \times 100$$

where the Control Mud, the Test Mud and the QUIK-THIN® thinner mud all had the same composition except that the Control Mud had no thinner added thereto, the Test Mud had the test thinner added thereto, and the QUIK-THIN® thinner mud had QUIK-THIN® thinner added thereto. QUIK-THIN® thinner is a ferro-chrome lignosulfonate, commercially available from Halliburton Energy Services, Inc. in Houston, Tex. and Duncan, Okla., that helps to control rheological and filtration properties of water-based drilling fluids and that can be used to maintain dispersed water-based drilling fluids. YP is an abbreviation for yield point.

A 22 lb/bbl Bentonite slurry, sheared in Gypsum/Salt water, was treated separately with QUIK-THIN® thinner, and a thinner/deflocculant of the invention at various concentrations and then rolled at 150° F. for 16 hours for initial screening tests. Tables 1 and 2 depict the rheological properties measured with a Fann 35A for three lb/bbl and five lb/bbl treatment of the thinner/deflocculant. The corresponding Thinning Efficiency (TE) was calculated from the above equation. As can be seen in Tables 1 and 2, not only did the thinner/deflocculant of the invention compare well with the ferro-chrome lignosulfonate thinner, but the Thinning Efficiency of the thinner/deflocculant of the invention increased with a decrease in the amount of thinner used relative to the ferro-chrome lignosulfonate thinner. This is particularly significant because ferro-lignosulfonates, and particularly QUICK-THIN® thinner, are leading prior art dispersants for clay particles in salt water.

TABLE 1

Thinning Efficiency of 5 lb/bbl Dispersants on Salt Water Mud after Hot-Rolling at 150° F. for 16 hours

|  | Control | Ferro-Chrome Lignosulfonate | Thinner/Deflocculant of Invention |
|---|---|---|---|
| pH | 7.06 | 9.43 | 9.7 |
| 600 rpm | 60 | 45 | 23 |
| 300 rpm | 50 | 32 | 12 |
| 6 rpm | 26 | 14 | 2 |
| 3 rpm | 25 | 13 | 1 |
| 10 s gel, lb/100 ft2 | 21 | 14 | 2 |
| 10 m gel, lb/100 ft2 | 23 | 19 | 18 |
| PV, cP | 10 | 13 | 11 |
| YP, lb/100 ft2 | 40 | 19 | 1 |
| TE, % |  | 100 | 186 |

TABLE 2

Thinning Efficiency of 3 lb/bbl Dispersants on Salt Water Mud after Hot-Rolling at 150° F. for 16 hours

|  | Control | Ferro-Chrome Lignosulfonate | Thinner/Deflocculant of Invention |
|---|---|---|---|
| pH | 7.06 | 9.13 | 9.68 |
| 600 rpm | 60 | 55 | 38 |
| 300 rpm | 50 | 42 | 25 |
| 6 rpm | 27 | 20 | 11 |
| 3 rpm | 26 | 19 | 10 |
| 10 s gel, lb/100 ft2 | 21 | 20 | 18 |
| 10 m gel, lb/100 ft2 | 23 | 55 | 41 |
| PV, cP | 10 | 13 | 13 |
| YP, lb/100 ft2 | 40 | 29 | 12 |
| TE, % |  | 100 | 255 |

The trend of the effect of the thinners/deflocculants on the yield point (YP) of the salt water bentonite slurry is shown in FIG. 1. The thinner/deflocculant of the invention continued to lower the yield point of the fluid with an increasing amount of the thinner/deflocculant like the ferro-chrome lignosulfonate but with significantly less thinner/deflocculant than with the ferro-chrome lignosulfonate. This is an indication of the effectiveness of the thinner/deflocculant of the invention in preventing the reduction of the repulsive forces by the electrolytes and allowing the clay particles to be dispersed at lower concentrations of the thinners than with ferro-chrome lignosulfonates.

Figure 2:
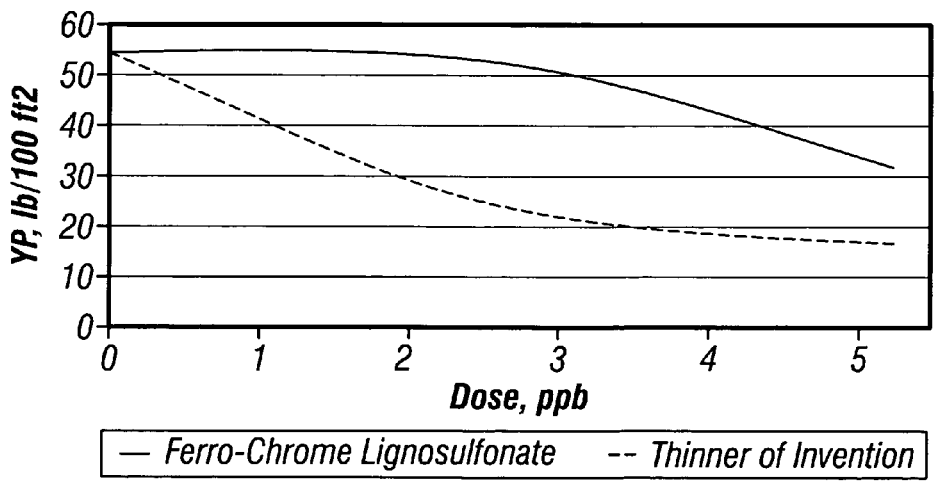
FIG. 2 is a graph comparing the yield point versus concentration of a thinner of the invention with a ferro-chrome, lignosulfonate thinner, in fresh water containing 66 lb/bbl Rev Dust and 22 lb/bbl Bentonite Slurry, hot rolled at 300° F.

A similar test was performed on the bentonite slurry in fresh water. Again, the results were very satisfactory for the thinner/deflocculant of the invention. In comparison to the ferro-chrome lignosulfonate, the thinner/deflocculant of the invention was effective in thinning the slurry at lower concentration. FIG. 2 shows the yield point of the thinners/deflocculants at various concentrations after rolling the sample at 300° F. for 16 hours.

In order to act as good deflocculants or dispersants in either fresh water or salt water, lignosulfonate thinners require some caustic soda to bring the pH of the fluid in the range of 8.5-10. At this pH level it is believed that most of the acidic functionalities are deprotonated to increase the anionic charge density. Thus, the pH effect on the thinners/deflocculants of the invention was evaluated relative to the lignosulfonate thinners.

Figure 3:
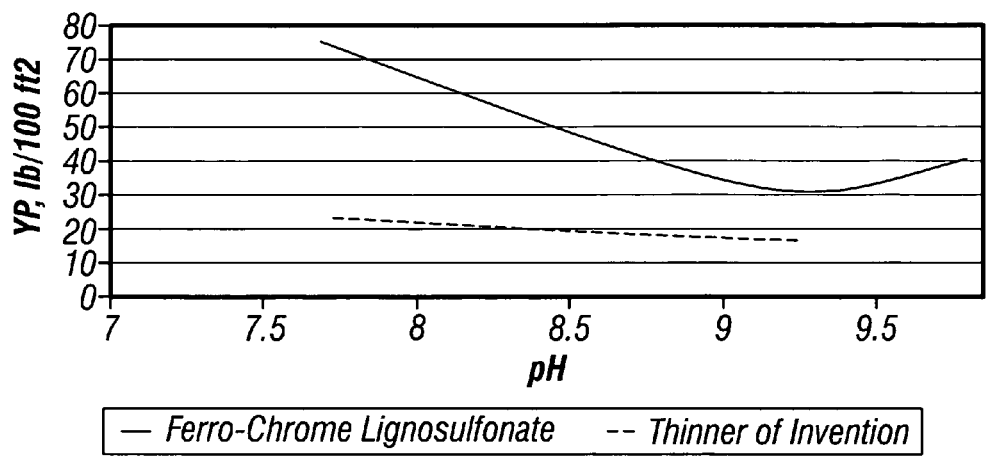
FIG. 3 is a graph comparing the yield point versus pH of a thinner of the invention with a ferro-chrome lignosulfonate thinner in a concentration of 5 lb/bbl in fresh water containing 66 lb/bbl Rev Dust and 22 lb/bbl Bentonite Slurry, hot rolled at 300° F.
Figure 4:
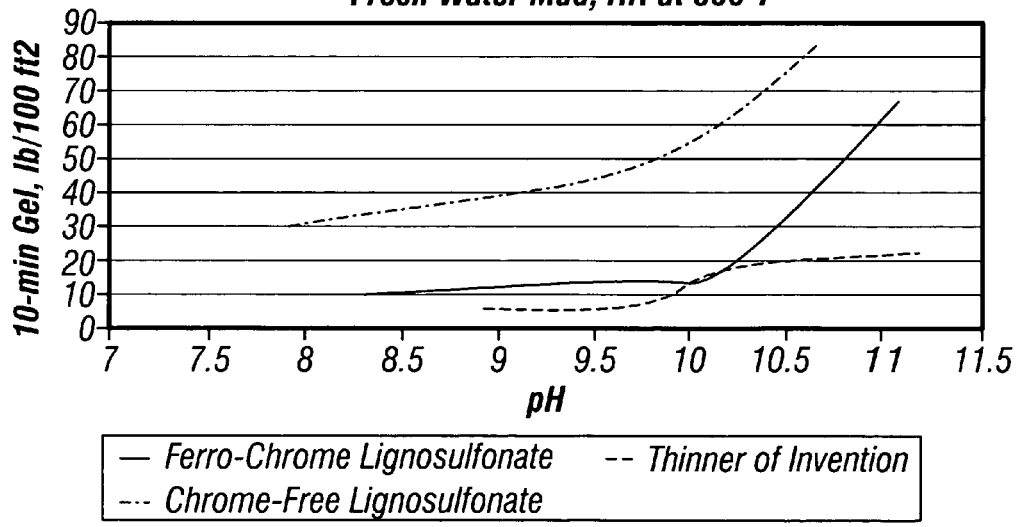
FIG. 4 is a graph comparing the gel strength versus pH of a thinner of the invention with a ferro-chrome lignosulfonate thinner and a chromium-free lignosulfonate thinner in a concentration of 5 lb/bbl in a fresh water drilling fluid, hot rolled at 300° F.

Bentonite slurry containing 66 lb/bbl of drilled solid material in fresh water was prepared and treated with 5 lb/bbl of each of the thinners and rolled for 16 hours at 300° F. Thereafter, each of the treated fluid samples was tested for yield point and gel strength while the pH was varied. The yield point and gel strength results were plotted against the pH as shown in FIGS. 3 and 4. The yield point values of the samples with the thinners/deflocculants of the invention were all lower than the values of the samples with the ferro-chrome lignosulfonate thinner for the pH range tested. The results show that the thinning effect of ferro-chrome lignosulfonate is more pH dependent than the thinning effect with the thinners/deflocculants of the invention.

Since the thinners adsorb on the edges of the clay particles to maintain an electric double layer and fortify the repulsive forces, the size of the double layer that results will depend on the anionic charge density of the thinner. The zeta potential will not decrease because the electrolyte tolerance capacity will increase with increase in charge density.

The zeta potentials and the electrophoretic mobility of the thinners/deflocculants of the invention were measured and the results are shown in Table 3 in comparison with the ferro-chrome lignosulfonate thinner. The zeta potentials of the thinners/deflocculants of the invention compared favorably with the ferro-chrome lignosulfonate thinner, which is indicative of why the thinners/deflocculants performed well in the salt water bentonite slurry.

TABLE 3

Zeta Potential Measurement

| Test Material | Zeta Potential (mV) | Electrophoretic Mobility (um * cm/vs) |
|---|---|---|
| Thinner/Deflocculant of Invention | 21 | −2 |
| Ferro-Chrome Lignosulfonate | 20 | −2 |

The lignosulfonate that results from spent sulfite liquor contains polymers having different degrees of sulfonation and varying molecular weights ranging from 1000 to 20000. It is much easier to control the molecular weight of a synthetic polymer, such as the thinner/deflocculant of the invention. A decrease in the thinning effect with increasing molecular weight is due to decrease in the charge density if the molecular weight is increased without increasing the corresponding anionic moieties.

Evaluations of thinning efficiencies of thinners/deflocculants as discussed above is not enough to determine whether the thinner/deflocculant will be an efficient and effective thinner when used in a drilling fluid or that the drilling fluid will be effective with such thinner. Thus, various laboratory water-based drilling fluid (mud) samples were mixed and used to evaluate the efficiency of the thinners/deflocculants of the invention in use in drilling fluids and the overall effectiveness of the drilling fluids with these thinners/deflocculants.

One laboratory barrel of each mud sample was mixed on the Hamilton Beach Multi-mixer for 60 minutes according to the formulations contained in the corresponding Tables 4-7 below. The thinners (in liquid form) were added to the mud samples at a 100% active level relative to the thinners (in solid form). The samples were pressurized in the mud cells and rolled for 16 hours at the temperatures indicated in the tables for each mud. In addition to QUIK-THIN® thinner which is a ferro-chrome lignosulfonate, the following trademarked products are used in the Tables below: ALDACIDE® G biocide; AQUAGEL® viscosifier, a finely ground, premium-grade Wyoming sodium bentonite which meets the American Petroleum Institute (API) Specification 13A, section 9 requirement (incorporated herein by reference); AQUAGEL GOLD SEAL® viscosifier, a 200 mesh, dry-powdered, premium, high-yielding Wyoming sodium bentonite containing no polymer additives or chemical treatments of any kind; BARAZAN® D PLUS viscosifier, a premium quality, powdered Xanthan gum polymer; BAROID® weighting material, a ground Barite that meets API Specification 13A section 7 requirement (incorporated herein by reference); ENVIRO-THIN™ thinner, a modified iron lignosulfonate that contains no chromium or other heavy metals; and FILTER-CHEKT™ filtration control agent. All of these trademarked products are available from Halliburton Energy Services, Inc. in Houston, Tex. and Duncan, Okla.

TABLE 4

16.0 lb/gal Freshwater Mud Formulation with 35 lb/bbl Rev Dust Mud Formulations and Properties

| Sample Mark | A | B | C |
|---|---|---|---|
| Freshwater, bbl | | 0.687 | |
| AQUAGEL GOLD SEAL ® viscosifier, lb | | 4 | |
| AQUAGEL ® viscosifier, lb | | 4 | |
| FILTER-CHEK ™ filtration control agent, lb | | 3 | |
| Rev Dust, lb | | 35 | |
| BAROID ® weighting material, lb | | 385 | |
| ALDACIDE ® G biocide, lb | | 0.2 | |
| Dry caustic soda, lb | | 0.35 | |
| Thinner/Deflocculant of Invention, lb | — | 5 | — |
| QUIK-THIN ® thinner, lb | — | — | 5 |
| 12.5N Liquid caustic soda, total ml | — | 0.8 | 0.6 |
| Rolled @300° F., hr | 16 | 16 | 16 |
| Stirred, min | 15 | 15 | 15 |
| Temperature, ° F. | 120 | | |
| Plastic viscosity, cP | 27 | 28 | 24 |
| Yield point, lb/100 ft² | 61 | −1 | 20 |
| 10 Sec gel, lb/100 ft² | 65 | 3 | 17 |
| 10 Min gel, lb/100 ft² | 215 | 3 | 65 |
| pH before rolling/pH after rolling | 9.06/8.21 | 9.60/8.51 | 9.55/7.96 |
| Fann 35 dial readings | | | |
| 600 rpm | 115 | 55 | 68 |
| 300 rpm | 88 | 27 | 44 |
| 200 rpm | 75 | 18 | 35 |
| 100 rpm | 65 | 10 | 76 |
| 6 rpm | 56 | 2 | 16 |
| 3 rpm | 55 | 2 | 15 |
| pH adjusted to | | 9.30 | 9.33 |
| Plastic viscosity, cP | | 29 | 28 |
| Yield point, lb/100 ft2 | | 0 | 11 |
| 10 Sec gel, lb/100 ft2 | | 2 | 13 |
| 10 Min gel, lb/100 ft2 | | 3 | 72 |
| 600 rpm | | 58 | 68 |
| 300 rpm | | 29 | 39 |
| 200 rpm | | 20 | 29 |
| 100 rpm | | 11 | 18 |
| 6 rpm | | 2 | 8 |
| 3 rpm | | 1 | 7 |

TABLE 5

14.0 lb/gal Freshwater Mud Formulation with 60 lb/bbl Rev Dust Mud Formulations and Properties at 300° F.

| Sample Mark | A | B | C |
|---|---|---|---|
| Freshwater, bbl | | 0.743 | |
| AQUAGEL GOLD SEAL ® viscosifier, lb | | 8 | |
| AQUAGEL ® viscosifier, lb | | 8 | |
| FILTER-CHEK ™ filtration control agent, lb | | 3.0 | |
| Rev Dust, lb | | 60 | |
| BAROID ® weighting agent, lb | | 249 | |
| ALDACIDE ® G biocide, lb | | 0.2 | |
| Dry caustic soda, lb | | 0.35 | |
| Thinner/Deflocculant of Invention, lb | — | 5 | — |
| QUIK-THIN ® thinner, lb | — | — | 5 |
| 12.5N Liquid caustic soda, total ml | — | 0.8 | 0.6 |
| Rolled @300° F., hr | 16 | 16 | 16 |
| Stirred, min | 15 | 15 | 15 |
| Temperature, ° F. | 120 | | |
| Plastic viscosity, cP | 32 | 46 | 43 |
| Yield point, lb/100 ft² | 111 | 7 | 102 |
| 10 Sec gel, lb/100 ft² | 98 | 4 | 65 |
| 10 Min gel, lb/100 ft² | — | 8 | 118 |
| pH before rolling/pH after rolling | 9.06/7.98 | 9.60/8.32 | 9.85/8.16 |
| Fann 35 dial readings | | | |
| 600 rpm | 175 | 99 | 188 |
| 300 rpm | 143 | 53 | 145 |
| 200 rpm | 132 | 38 | 123 |
| 100 rpm | 123 | 21 | 100 |
| 6 rpm | 115 | 4 | 74 |
| 3 rpm | 112 | 2 | 70 |
| pH adjusted to | — | 9.36 | 9.31 |
| Plastic viscosity, cP | — | 56 | 56 |
| Yield point, lb/100 ft2 | — | 8 | 75 |
| 10 Sec gel, lb/100 ft2 | — | 4 | 65 |
| 10 Min gel, lb/100 ft2 | — | 32 | 114 |
| API, mL/30 min | — | 4.5 | 6.3 |
| 600 rpm | — | 120 | 187 |
| 300 rpm | — | 64 | 131 |
| 200 rpm | — | 45 | 119 |
| 100 rpm | — | 25 | 85 |
| 6 rpm | — | 4 | 57 |
| 3 rpm | — | 2 | 55 |

TABLE 6

14.0 lb/gal Freshwater Mud Formulation with 60 lb/bbl Rev Dust Mud Formulations and Properties at 400° F.

| Sample Mark | A | B | C |
|---|---|---|---|
| Freshwater, bbl | | 0.743 | |
| AQUAGEL GOLD SEAL ® viscosifier, lb | | 8 | |

TABLE 6-continued 14.0 lb/gal Freshwater Mud Formulation with 60 lb/bbl Rev Dust Mud Formulations and Properties at 400° F.

| Sample Mark | A | B | C |
|---|---|---|---|
| AQUAGEL ® viscosifier, lb | | 8 | |
| FILTER-CHEK ™ filtration control agent, lb | | 3.0 | |
| Rev Dust, lb | | 60 | |
| BAROID ® weighting agent, lb | | 249 | |
| ALDACIDE ® G biocide, lb | | 0.2 | |
| Dry caustic soda, lb | | 0.35 | |
| Thinner/Deflocculant of Invention, lb | — | 5 | — |
| QUIK-THIN ® thinner, lb | — | — | 5 |
| 12.5N Liquid caustic soda, total ml | — | 0.8 | 0.6 |
| Rolled @400° F., hr | 16 | 16 | 16 |
| Stirred, min | 15 | 15 | 15 |
| Temperature, ° F. | | 120 | |
| Plastic viscosity, cP | 48 | 63 | 44 |
| Yield point, lb/100 ft² | 164 | 47 | 99 |
| 10 Sec gel, lb/100 ft² | 122 | 7 | — |
| 10 Min gel, lb/100 ft² | 154 | 155 | — |
| pH before rolling/pH after rolling | 9.02/7.05 | 9.60/8.32 | 9.55/8.06 |
| Fann 35 dial readings | | | |
| 600 rpm | 260 | 173 | 187 |
| 300 rpm | 212 | 110 | 143 |
| 200 rpm | 188 | 84 | 117 |
| 100 rpm | 182 | 53 | 105 |
| 6 rpm | 141 | 15 | 85 |
| 3 rpm | 140 | 10 | 84 |
| pH adjusted to | | 9.36 | 9.33 |
| Plastic viscosity, cP | | 49 | 76 |
| Yield point, lb/100 ft2 | | 14 | 93 |
| 10 Sec gel, lb/100 ft2 | | 7 | 113 |
| 10 Min gel, lb/100 ft2 | | 170 | 262 |
| 600 rpm | | 112 | 245 |
| 300 rpm | | 63 | 169 |
| 200 rpm | | 47 | 145 |
| 100 rpm | | 26 | 127 |
| 6 rpm | | 3 | 117 |
| 3 rpm | | 2 | 115 |

TABLE 7

13.0 lb/gal Freshwater Mud Formulation with 35 lb/bbl Rev Dust Mud Formulations and Properties

| Sample Mark | A | B | C |
|---|---|---|---|
| Freshwater, bbl | | 0.791 | |
| AQUAGEL ® viscosifier, lb | | 8 | |
| BARAZAN D PLUS ® viscosifier | | 0.25 | |
| FILTER-CHEK ™ filtration control agent, lb | | 3 | |
| Rev Dust, lb | | 35 | |
| BAROID ® weighting agent, lb | | 219 | |
| ALDACIDE ® G biocide, lb | | 0.2 | |
| Dry caustic soda, lb | | 0.35 | |
| Thinner/Deflocculant of invention, lb | 3 | — | — |
| QUIK-THIN ® thinner, lb | — | — | — |
| ENVIRO-THIN ® thinner, lb | — | — | 3 |
| 12.5N Liquid caustic soda, total ml | 0.8 | 1.3 | 1.4 |
| Rolled @300° F., hr | 16 | 16 | 16 |
| Stirred, min | 15 | 15 | 15 |
| Temperature, ° F. | | 120 | |
| Plastic viscosity, cP | 22 | 18 | 19 |
| Yield point, lb/100 ft² | 8 | 4 | 12 |
| 10 Sec gel, lb/100 ft² | 2 | 2 | 8 |
| 10 Min gel, lb/100 ft² | 5 | 4 | 30 |
| pH | 9.56/8.92 | 9.60/7.08 | 9.55/7.91 |
| Fann 35 dial readings | | | |
| 600 rpm | 52 | 40 | 50 |
| 300 rpm | 30 | 22 | 31 |
| 200 rpm | 22 | 17 | 25 |
| 100 rpm | 13 | 10 | 17 |

TABLE 7-continued 13.0 lb/gal Freshwater Mud Formulation with 35 lb/bbl Rev Dust Mud Formulations and Properties

| Sample Mark | A | B | C |
|---|---|---|---|
| 6 rpm | 2 | 2 | 8 |
| 3 rpm | 1 | 1 | 7 |

Figure 5:
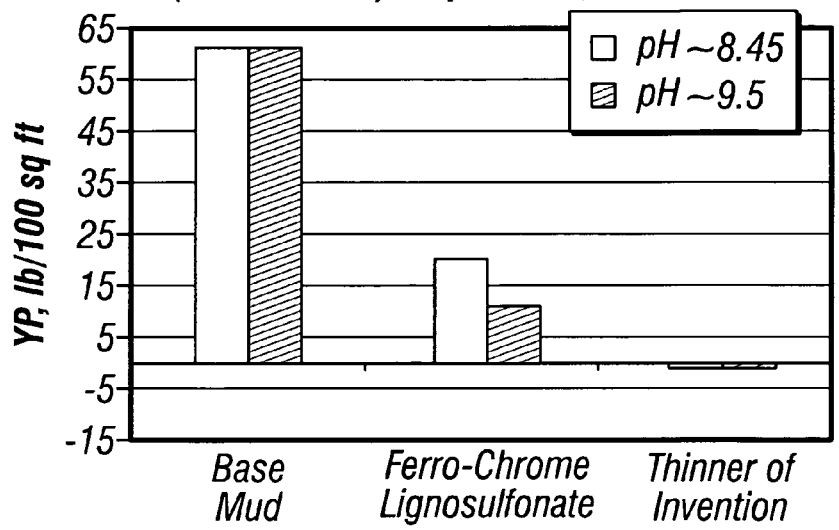
FIG. 5 is a bar graph comparing the yield point of samples of a 16 ppg water-based drilling fluid having no thinner, having 5 lb/bbl (100% active) ferro-chrome lignosulfonate thinner, and having 5 lb/bbl (100% active) thinner of the invention, hot rolled at 300° F.

FIG. 5 depicts the yield point of the 16 lb/gal mud samples treated with 5 lb/bbl of a thinner/deflocculant of the invention in comparison with a ferro-chrome lignosulfonate thinner at 300° F. The thinning effect of the ferro-chrome lignosulfonate thinner varied with the pH but the thinning effect with the thinner/deflocculant of the invention remained unaffected at the pH tested. The thinner/deflocculant of the invention also reduced the yield point lower than the ferro-chrome lignosulfonate (see Table 4).

Figure 6:
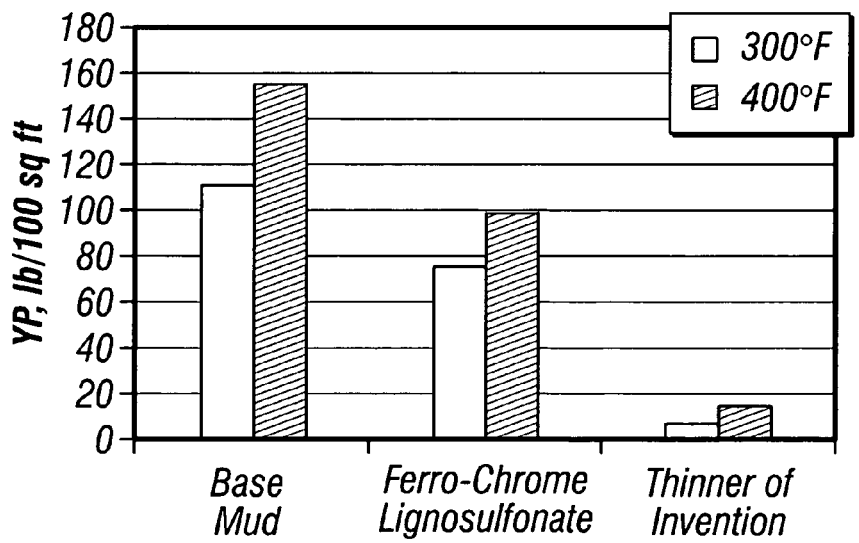
FIG. 6 is a bar graph comparing the yield point of samples of a 14 ppg water-based drilling fluid having no thinner, having 5 lb/bbl (100% active) ferro-chrome lignosulfonate thinner, and having 5 lb/bbl (100% active) thinner of the invention, hot rolled at 300° F., and hot rolled at 400° F.

The thinning efficiency of the thinners/deflocculants was evaluated on a 14 lb/gal mud having 10% drill solid and high concentration of bentonite. All mud samples were treated with a 5 lb/bbl dispersant at 100% active level. The mud samples were rolled at 300° F. and 400° F. for 16 hours. The yield point values of the mud samples are shown in FIG. 6 (see also Tables 5 and 6). The yield point of the mud containing the ferro-chrome lignosulfonate thinner decreased from the untreated base mud, but the yield point values of the mud samples with the thinner/deflocculant of the invention were much lower than that of the mud containing the lignosulfonate thinner. The increase in temperature to 400° F. resulted in significant increase in the yield point values of the lignosulfonate mud sample while the yield point values of mud with the thinner/deflocculant of the invention minimally increased. This observation demonstrates the advantages of the present invention at such higher temperatures.

Figure 7:
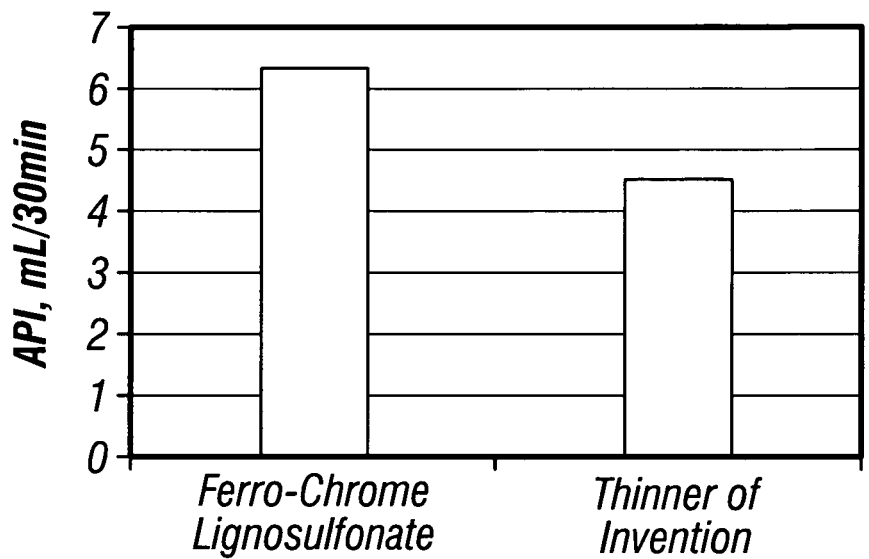
FIG. 7 is a bar graph comparing the relative API filtrate of 14 lb/gal fresh water-based drilling fluid treated with either 5 lb/bbl (100% active) ferro-chrome lignosulfonate thinner or with 5 lb/bbl (100% active) thinner of the invention.

The effect of thinners/dispersants of the invention on the filtration control of the fluid systems was also evaluated and compared to lignosulfonate thinners. Four 14 lb/gal and 13 lb/gal mud samples were made and treated with 5 lb/bbl of the thinners, and rolled at 300° F. for 16 hours. The pH of the fluids were adjusted with 50% sodium hydroxide solution to 9.3-9.8. The results obtained from the API filtration testing are depicted in FIG. 7 for the sample's filtrate after 30 minutes. The thinner/deflocculant of the invention had lower filtrate values than the lignosulfonate thinners (see Table 7).

The above tests demonstrate that thinners/deflocculants of the present invention lower the viscosity and gel strength of thick aqueous-based drilling fluids as well as or better than the best lignosulfonate thinners and such drilling fluids of the present invention have high deflocculating power and are more salt tolerant and stable at high temperatures than comparable fluids thinned with lignosulfonate thinners.

As indicated above, the advantages of the methods of the invention may be obtained by employing a drilling fluid of the invention, including the thinner/deflocculant of the invention, in drilling operations. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures.

The foregoing description of the invention is intended to be a description of preferred embodiments. Various changes in the details of the described fluids and methods of use can be made without departing from the intended scope of this invention as defined by the appended claims.

What is claimed is:

1. A method for thinning or dispersing an aqueous based drilling fluid for drilling a borehole in a subterranean formation, comprising:
    adding to the fluid an additive comprising a polyamide-based copolymer having at least one grafted side chain formed from ethylenic unsaturated compounds; and
    adapting the pH of the fluid to have a pH in the range of about 8.0 to about 10.5;
    wherein the additive has a thinning effect on the drilling fluid, lowering the yield point of the fluid.

2. The method of claim 1 wherein the drilling fluid contains no heavy metals.

3. The method of claim 1 wherein the aqueous base of the drilling fluid is fresh water.

4. The method of claim 1 wherein the aqueous base of the drilling fluid is brine or salt water.

5. The method of claim 1 wherein the fluid comprises about 2 to about 8 pounds per barrel of the copolymer.

6. The method of claim 1 wherein the additive comprises a graft-copolymer of acrylic acid and acrylo amido propane sulfonate onto gelatin.

7. The method of claim 1 wherein the drilling fluid has a pH in the range of about 8.0 to about 8.5.

8. A method of deflocculating an aqueous based drilling fluid for drilling a borehole in a subterranean formation, comprising:
    adding to the fluid an additive comprising a polyamide-based copolymer having at least one grafted side chain formed from ethylenic unsaturated compounds; and
    adapting the pH of the fluid to have a pH in the range of about 8.0 to about 10.5;
    wherein the additive has a deflocculating effect on the drilling fluid.

9. The method of claim 8 wherein the additive comprises a graft-copolymer of acrylic acid and acrylo amido propane sulfonate onto gelatin.

10. The method of claim 8 wherein the drilling fluid has a pH in the range of about 8.0 to about 8.5.

11. A method for drilling a wellbore in a hydrocarbon-bearing subterranean formation having water-sensitive formations and a temperature in the range of about 40° F. to about 400° F., the method comprising:
    providing an aqueous based drilling fluid having been thinned or dispersed with an additive comprising a polyamide-based copolymer having at least one grafted side chain formed from ethylenic unsaturated compounds and having a pH in the range of about 8.0 to about 10.5, such that the fluid has a lower yield point than without the additive; and
    drilling in the subterranean formation, with the fluid maintaining stability without damage to or swelling of the water-sensitive formations.

12. The method of claim 11 wherein the additive comprises a graft-copolymer of acrylic acid and acrylo amido propane sulfonate onto gelatin.

13. The method of claim 11 wherein the drilling fluid contains no heavy metals and is environmentally compatible.

14. The method of claim 11 wherein the additive enhances the rheological stability of the drilling fluid in the presence of fluid contaminants.

15. The method of claim 11 wherein the additive enhances the rheological stability of the drilling fluid at high temperatures.

16. The method of claim 11 wherein the aqueous base is fresh water.

17. The method of claim 11 wherein the aqueous base is saltwater or brine.

18. The method of claim 11 wherein the drilling is through at least one producing zone in the formation.

* * * * *